United States Patent [19]
Hamberg et al.

[11] Patent Number: 4,783,062
[45] Date of Patent: Nov. 8, 1988

[54] ELECTRONIC HYDRAULIC MOUNT-INTERNAL SOLENOID

[75] Inventors: James P. Hamberg; John F. Hoying, both of Dayton, Ohio

[73] Assignee: General Motors Corporation, Detroit, Mich.

[21] Appl. No.: 68,428

[22] Filed: Jul. 1, 1987

[51] Int. Cl.[4] ............................................. F16F 9/34
[52] U.S. Cl. .................................. 267/140.1; 248/566
[58] Field of Search .............. 248/550, 562, 566, 609; 267/121, 140.1; 280/707

[56] References Cited

U.S. PATENT DOCUMENTS

| | | | |
|---|---|---|---|
| 4,422,779 | 12/1983 | Hamaekers et al. | 267/140.1 X |
| 4,583,723 | 4/1986 | Ozawa | 267/140.1 |
| 4,588,173 | 5/1986 | Gold et al. | 267/140.1 |
| 4,641,808 | 2/1987 | Flower | 267/140.1 X |
| 4,671,227 | 6/1987 | Hollerweger et al. | 267/140.1 X |
| 4,700,933 | 10/1987 | Chikamori et al. | 267/140.1 |

FOREIGN PATENT DOCUMENTS

| | | | |
|---|---|---|---|
| 0073146 | 4/1985 | Japan | 267/140.1 |
| 0248934 | 11/1986 | Japan | 267/140.1 |

Primary Examiner—Duane A. Reger
Attorney, Agent, or Firm—R. L. Phillips

[57] ABSTRACT

A hydraulic mount assembly includes a pair of mounting members connected to each other through a hollow elastomeric body of natural or synthetic rubber. The body is closed by a resilient diaphragm so as to form a cavity for damping liquid. A partition or plate is provided to divide the fluid filled cavity into two distinct chambers. A primary chamber is formed between the partition and the interior wall of the hollow body. A secondary chamber is formed between the partition and the interior wall of the diaphragm. The partition includes at least two passages connecting the two chambers. A sliding gate extends across the entry to the passages. This gate is displaceable to direct the flow of fluid between the primary and secondary chambers through a selected passage or passages in the partition. A solenoid actuator mounted on the partition includes multiple electric coils that allow the positive positioning of the gate. A control circuit with onboard transducers is provided to monitor vehicle operating and road conditions. A microprocessor acts in response to the sensed conditions causing the necessary sequential energization of the series of coils.

1 Claim, 2 Drawing Sheets

ELECTRONIC HYDRAULIC MOUNT-INTERNAL SOLENOID

TECHNICAL FIELD

The present invention relates generally to hydraulic mounts for vibration damping and, more particularly, to an electronically controlled hydraulic mount assembly designed to provide variable damping characteristics.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the orifice plate and the body. The secondary chamber is formed between the plate and the diaphragm.

A decoupler is positioned in the orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high velocity fluid flow through the orifice track, and accordingly a high level of damping force and smoothing action. As a third (intermediate) operational mode of the mount, medium amplitude inputs produce lower velocity fluid flow through the orifice track resulting in the desired medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the dynamic characteristics of the mount. Advantageously, such a mount allows active rather than passive control of the dynamic characteristics of a mount. Thus, more efficient and effective isolation of vibrations and suppression of noises may be provided.

A previously developed hydraulic mount includes a rotary solenoid to open and close a fluid bypass port between the two fluid-filled chambers of the mount. When the bypass valve is closed, high levels of damping and rate are generated as fluid is forced from one chamber to the other through a small, fixed orifice. Conversely, when the bypass valve is open the fluid bypasses the small, fixed orifice and the mount generates very little fluid damping.

While this prior mount does provide for some control of damping characteristics in response to vehicle operating conditions, it is not without its disadvantages. More specifically, the solenoid actuator is mounted external to the mount body. Unless a high integrity seal is maintained between the mount body and the solenoid actuator, the mount fails. Due to the hostile environment of the mount, such a seal is very difficult to maintain over time. This results in the mount being susceptible to premature failure.

U.S. Pat. No. 4,583,723 to Ozawa discloses an hydraulic elastomeric mount addressing this problem. The Ozawa mount includes an electromagnetic coil mounted within the bottom plate of the mount. The movement of a two portion plate between the two chambers of the mount is controlled by the coil. This system provides either minimum damping by allowing maximum plate movement when the coil is deenergized, or maximum damping by restricting the movement when energized.

Essentially both of the prior art mounts operate in an on/off mode providing essentially either mushy or hard dynamic characteristics. Thus, effective vibration damping and noise suppression are provided by these mounts over only a relatively narrow vibration frequency range. Consequently, mounts of this type are most effectively utilized for specific applications where the vehicle component or member being damped exhibits vibrations that peak at one particular resonance frequency to which the mount is matched.

Adjustable mounts such as these, have thus proved only marginally effective in active damping situations that exist with engines and transmissions in motor vehicles. In these environments peak vibrations occur at more than one resonance frequency depending upon vehicle operating conditions. For example, an engine may vibrate at one resonance frequency during lugging, at another during rapid acceleration and at still another during sustained high RPM operation.

A need is therefore identified for an improved electronic hydraulic mount assembly that provides for selective high efficiency damping at multiple resonance frequencies exhibited by the component being damped. In this way the dynamic characteristics of the mount can be tuned, either manually or automatically, to provide the most effective and efficient damping and noise suppression of the member over the entire range of expected operating conditions.

SUMMARY OF THE INVENTION

Accordingly, it is a primary object of the present invention to provide a hydraulic mount assembly overcoming the limitations and disadvantages of the prior art.

Another object of the present invention is to provide a tunable hydraulic mount assembly having a self-contained, sealed construction that is not only inexpensive to build but provides highly reliable operation.

An additional object of the present invention is to provide a hydraulic mount assembly that is tunable to the resonance frequencies characteristic of the vehicle component being damped so as to more efficiently and effectively isolate vibrations and suppress noise over the full range of vehicle operating and road conditions.

Yet another object of the present invention is to provide a hydraulic mount that allows the dynamic characteristics to be actively controlled by varying the flow of fluid between the two chambers of the mount assembly in response to an electronic control circuit.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes at least two passages or orifice tracks connecting the two chambers. According to an important aspect of the invention, a sliding gate extends across the entry to the passages. This gate serves as a valve and is displaceable to direct the flow of fluid between the primary and secondary chambers through a selected one or both of the passages in the partition. The positioning of the gate is positively controlled by means of a solenoid actuator mounted within the partition.

In operation of the mount, vibration forces within the design amplitudes and frequencies of the mount produce a contraction of the hollow body and primary chamber. Upon contraction (compression), liquid flows from the primary to the secondary chamber through the selected passage or passages at the designed rate of flow. This entering liquid causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

In addition to the above basic structure, the mount assembly of the invention is characterized by the active tuning concept referred to briefly above. More specifically, the mount includes means for matching the dynamic characteristics of the mount to the resonance frequency exhibited by the member being damped under particular operating conditions. The invention effectively provides for the adjusting of the liquid flow between the two chambers in direct response to actual vehicle operating conditions.

Of particular significance, the mount assembly includes a control means that may be utilized to actively regulate the liquid flow between the chambers in response to the vibration being produced at any given time under vehicle operating and road conditions. Thus, the mount assembly may be made directly responsive to sensing means, such as vehicle mounted transducers, so as to more efficiently and effectively isolate vibrations. This active control means for the mount of the invention is highly effective over a broader range of vibration amplitudes and frequencies than previously obtainable with purely passive state-of-the-art devices.

Preferably, the control of flow between the chambers is accomplished by positively positioning a feed opening in the gate into alignment with a selected passage or passages extending between the chambers. In the embodiment described, four separate positions are provided with a first seated position allowing substantially unrestricted and straight through flow between the chambers. The remaining three positions provide a stepped increase in the damping characteristics of the mount to a maximum level for more efficient and effective suppression of noise and vibration at each resonance frequency level. As a result, the component is damped at the highest efficiency under any combination of vehicle operating and road conditions.

The gate is adapted for sliding movement along a guide track on the partition. The, solenoid actuator for the gate includes a series of four electrical coils individually connected to a voltage source that is responsive to the controlling means. Since the gate includes an end formed of magnetic material so as to be magnetically responsive to the magnetic force produced by an energized electric coil, the position of the gate within the partition is positively controlled. As a result, fluid flow between the chambers may be selectively directed immediately in response to vibrations sensed by the transducers of the controlling means. The quicker response results in more efficient and effective control of vibration and noise in the vehicle.

Still other objects of the present invention will become apparent to those skilled in this art from the following description when they are shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing.

Figure 1:
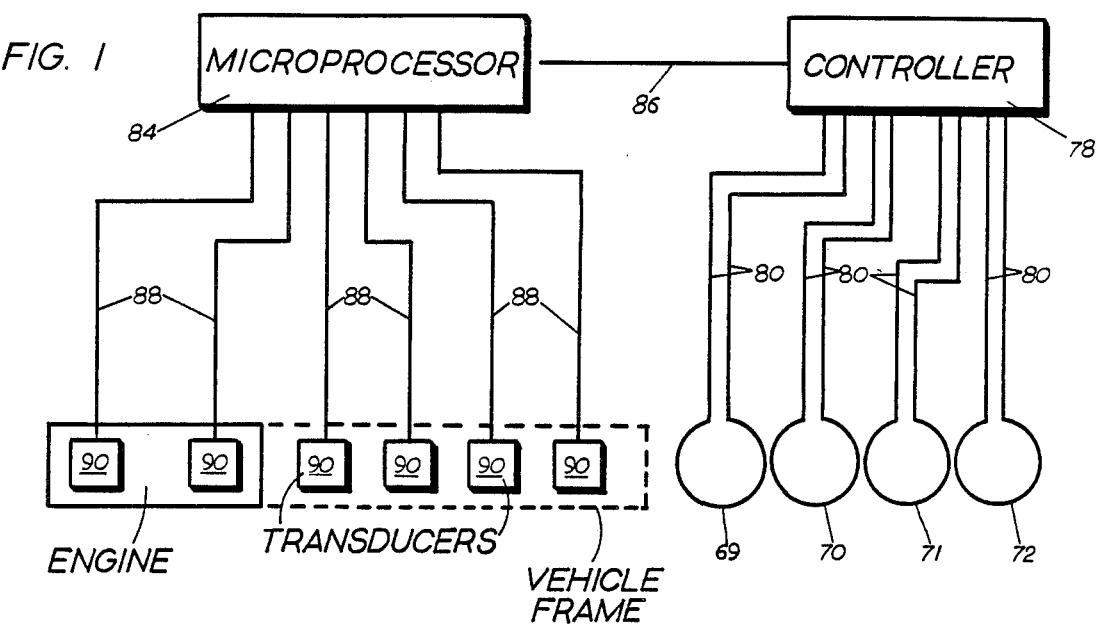
FIG. 1 is a schematical representation of the control circuit of the hydraulic mount assembly of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the improved hydraulic-elastomeric mount assembly of the present invention particularly adapted for mounting a component, such as an internal combustion engine in a vehicle. The dynamic characteristics of the mount assembly may be adjusted or tuned to meet the specific application. As a result, the desired amplitude control, as well as the coefficient of damping and resulting dynamic rate best suited to isolate a particular set of vibration conditions, can be obtained.

Figure 2:
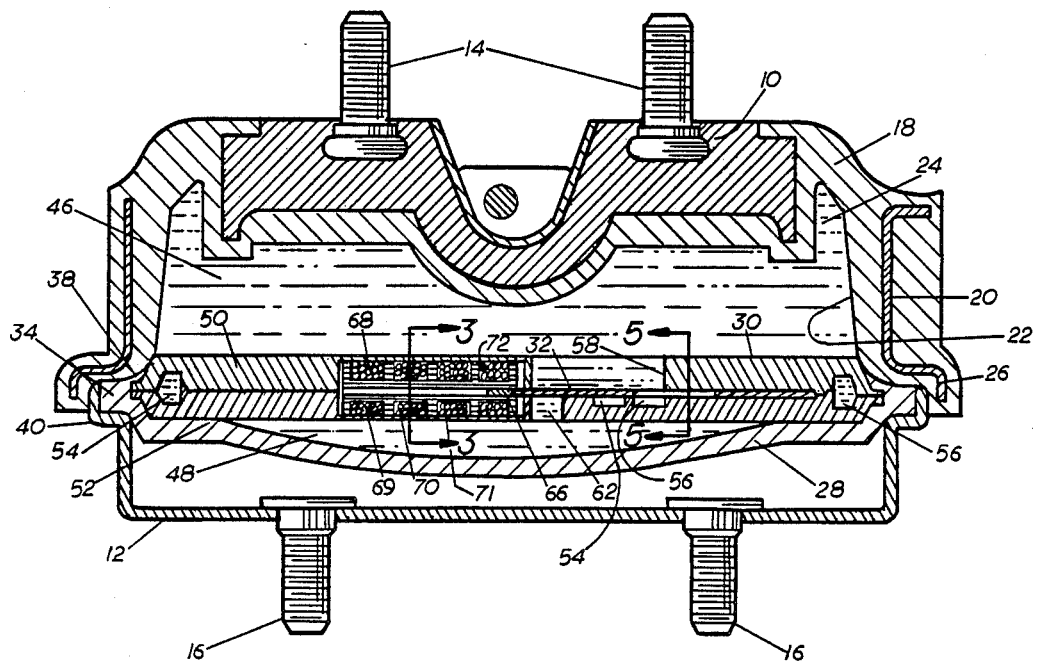
FIG. 2 is a cross-sectional view of the hydraulic mount assembly with a flow directing gate aligned with a relatively long orifice track for maximum damping.
Figure 3:
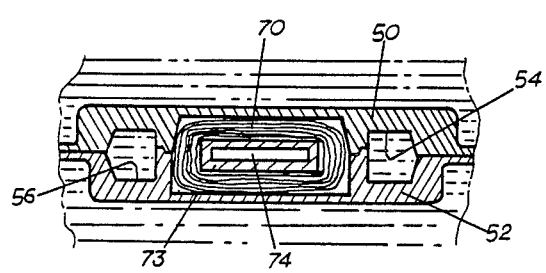
FIG. 3 is a cross-sectional view through the partition along line 3—3 of FIG. 2.

The mount assembly includes a cast metal mounting member 10 and stamped sheet metal mounting member 12, as shown in FIG. 2. The mounting members 10 and 12 have a pair of mounting studs 14, 16, respectively. These studs 14, 16 project outwardly from the mounting members 10, 12 for attachment respectively to an engine (not shown) and an engine supporting cradle or frame of a vehicle (not shown).

A hollow elastomeric body 18 interconnects the mounting members 10, 12. The body 18 is constructed of natural or synthetic rubber. More specifically, the body 18 may be molded to and about the mounting member 10 and includes an embedded stamped sheet metal retainer 20.

The body 18 defines a hollow cavity 22 for receiving a damping liquid, such as commercial engine antifreeze/coolant. Oppositely located voids 24 are formed in the body 18 between the mounting member 10 and the retainer 20. These voids 24 provide directional dynamic rate control within the elastomeric body 18 itself and form a part of the damping liquid cavity 22. As is known in the art, such voids 24 are especially useful in isolating certain internal combustion engine vibrations.

Together, the mounting member 10, elastomeric body 18 and metal retainer 20 form a first subassembly or cover of the mount assembly. The retainer 20 includes an outwardly projecting collar 26 at its lower periphery. The collar 26 is formed to receive a second subassembly or base. The base comprises the mounting member 12 and elastomeric diaphragm 28 of natural or synthetic rubber, a partition 30 with the flow orifice and a slide gate 32 that acts as a valve, as described in further detail below.

The elastomeric diaphragm 28 includes an annular rim portion 34 having a peripheral groove formed between upper and lower shoulders 38, 40 respectively. The shoulders 38, 40 are flexible so as to receive the outer edge of the partition 30. Thus, the partition 30 is sealingly engaged by the shoulders 38, 40 on opposite sides of the groove.

The mounting member 12 is formed with a collar to receive the rim portion 34 of the diaphragm 28. The collar of the mounting member 12 fits within the collar 26 of the retainer 20. As is known in the art, tabs (not shown) may be provided on the collar 26 and bent over to retain and seal the whole mount assembly.

The elastomeric diaphragm 28 closes the elastomeric body 18 so as to form therewith the closed damping cavity 22. This cavity 22 is divided by the partition 30 into a primary chamber 46 enclosed by the elastomeric body 18 and a secondary chamber 48 enclosed by the diaphragm 28.

The partition 30 is formed of non-magnetic material, such as die cast aluminum as shown, or plastic; and includes a pair of plates 50, 52 with matching peripheries. As shown in FIG. 2, these plates span the cavity 22 and cooperate to define a pair of passages or extended damping orifice tracks 54, 56 interconnecting the chambers 46, 48.

Figure 4:
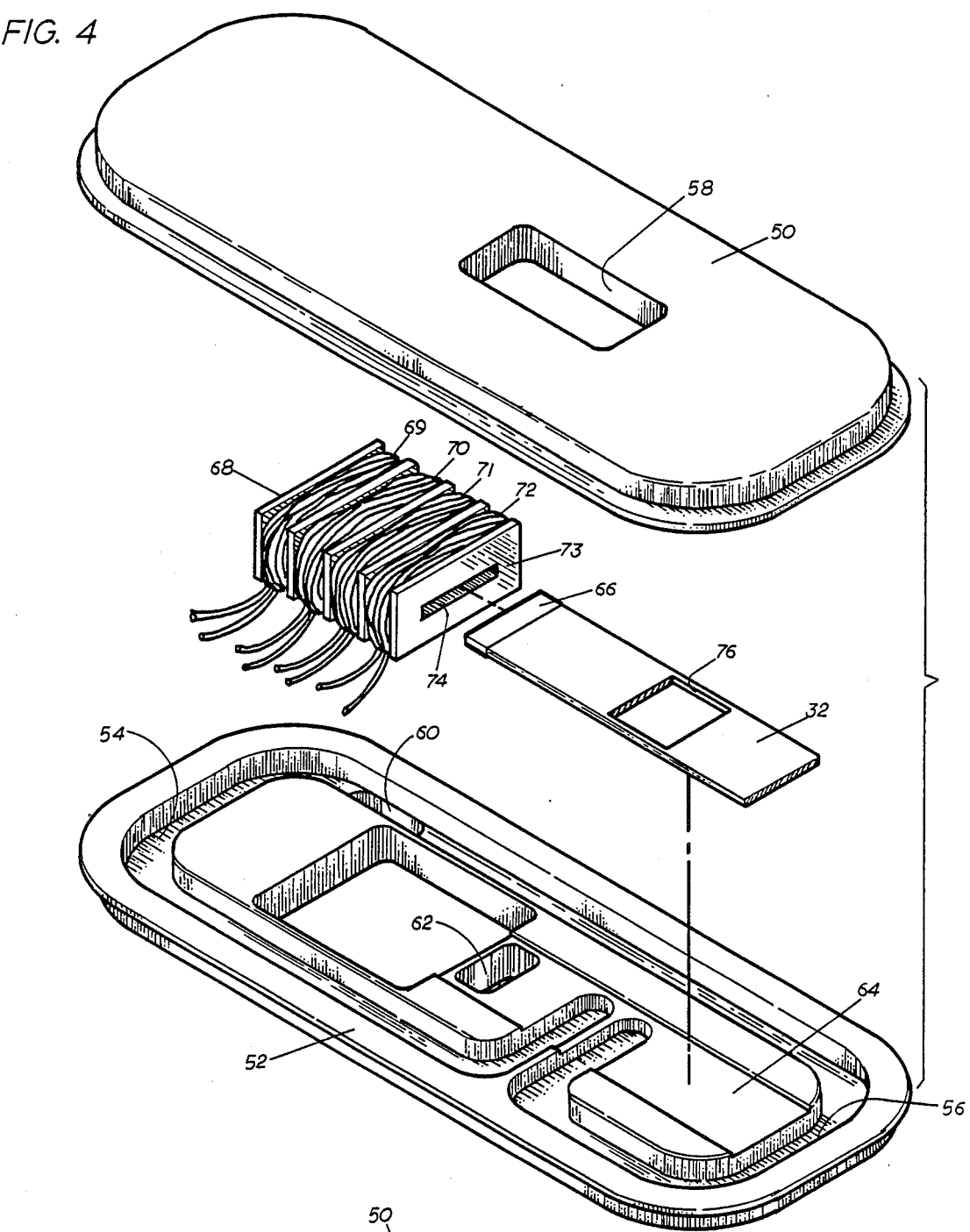
FIG. 4 is an enlarged exploded view of the partition of the present invention showing the damping liquid flow passages and the gate and solenoid actuator that allow selective directing of the damping liquid flow through these passages.
Figure 5:
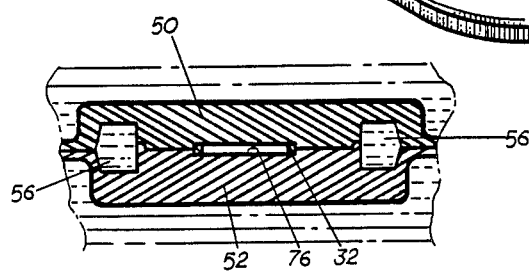
FIG. 5 is an additional cross-sectional view through the partition plate along line 5—5 of FIG. 2.

One opening 58 is provided in the plate 50 in alignment with the entry to each track 54, 56. The tracks 54, 56 communicate with the primary chamber 46 through this opening 58. Another opening 60 is provided in the plate 52 at the opposite end of the orifice tracks 54, 56 for communication between the tracks and the secondary chamber 48 (see FIG. 4). Thus, the orifice tracks 54, 56 interconnect the chambers 46, 48 and are formed to selected lengths to provide differing damping characteristics.

The plate 52 is also provided with a center opening or passage 62. This passage 62 is also aligned with the opening 58 in the opposite plate 50. Thus, the opening 62 allows substantially direct and unrestricted "flow-through" communication between the primary and secondary chambers 46, 48 thereby providing isolation for the mount, or substantially no damping.

Advantageously, the damping and rate characteristics of the mount 10 may be positively tuned to the vibration resonance frequencies exhibited by the component to be damped under a number of different vehicle operating conditions. This is possible through the provision of a valve structure that allows for selectively directing the flow of damping liquid through the passages 54, 56, 62 between the primary and secondary chambers 46, 48.

More specifically, the slide gate 32, in the form of an elongated plate, is positioned across the entry to the passages 54, 56 and 62. The opening 58 in the plate 50 generally overlies these entryways. The gate 32 is adapted for sliding movement along a track 64 between the partition plates 50, 52 (see FIGS. 2 and 4). A band of magnetic material 66 is provided at one end of the gate 32 to cause the movement, as will be seen in detail below.

A solenoid actuator 68 including a series of individual electric coils 69–72 on a frame 73 is mounted between the partition plates 50, 52. The solenoid actuator 68 has a central slot 74 specifically adapted to receive and guide the end of the gate 32 including the magnetic band 66. Thus, when one of the coils 69–72 is energized, the resulting magnetic force causes the gate 32 to slide along the track 64 and through the central slot 74. In this manner, the gate 32 is positively positioned to bring feed opening 76 in the gate in direct alignment with a selected passage or passages 54, 56, 62 so as to provide variable damping to the mount assembly 10.

The circuit for controlling the damping characteristics of the mount assembly 10 is shown schematically in FIG. 1. As shown, the coils 69–72 are each connected to an electric controller 78 by wiring lead 80. The controller 78 is responsive to a microprocessor 84 through line 86. The microprocessor 84 is connected through signal feed lines 88 to a series of transducers 90, which form a means for sensing vehicle operating conditions and resulting vibrations.

The transducers 90 are mounted on board the vehicle, such as on the engine and the frame of the vehicle at various locations in order to instantaneously sense vibration amplitude and frequency during operation. To be more specific, transducers 90 may be various electronic devices positioned in engagement with the engine block and frame adjacent the mount assemblies. These transducers 90 are sensitive to the full range of vibratory conditions produced, during, for example, idling, rapid acceleration and deceleration, highway cruising and engine lugging.

The information relative to engine vibration amplitude and frequency that is sensed by the transducers 90 is immediately communicated along the lines 88 to the microprocessor 84. The information is then processed and a pre-programmed response output signal is communicated along line 86 to the individual controller 78 for the mount assembly. The controller 78 then applies a voltage to one of the coils 69–72. The resulting magnetic field produced by the energized coil 69, 70, 71, or 72 imparts movement to the gate 32. More specifically, the magnetic band 66 at the end of the gate 32 is drawn into alignment within the energized coil. For the gate 32 to move from one position to the next, the microprocessor 84 is programmed to sequentially actuate the coils, as necessary. In this way, the gate 32 is positively positioned in any one of the four positions in response to vehicle operating conditions and resulting vibrations. This results in the feed opening 76 directing damping liquid flow between the chambers 46, 48 through one or more selected passages 54, 56 and/or 62 (see FIG. 4).

Effectively three different track openings are possible. That is, the opening 76 may be aligned with one passage 56, the other passage 54, or with both passages 56 and 54 at the same time. The partition plates 50, 52 may be made with the tracks 54, 56 of any length so that virtually any level of damping is possible. One of the many possible combinations of damping is outlined below.

Where the relatively long passage or orifice track 56 is selected, a large damping effect is produced to the designed resonance of the column of liquid in the track. In effect, the increased resistance to flow along the track and the inertial effects of the liquid column serve to effectively and efficiently suppress large amplitude vibrations. For this mode, the solenoid coil 72 is energized positioning the magnetic band 66 inside the coil and the opening 76 aligned with the passage 56 (see FIG. 2). This position is most effective to suppress large amplitude/low frequency vibrations, such as engine lugging or the like.

Conversely, when the transducers 90 sense low vibration frequencies and amplitudes, such as during engine idling, microprocessor 84 causes the control 78 to energize in sequence coils 71, 70, 69. This serves to draw the magnetic band 66 into alignment within the coil 69 and, therefore, the feed opening 76 into alignment with the passage 62. In this position, damping liquid flow between the chambers 46, 48 is relatively unrestricted through the partition 30, i.e., fluid flows directly through openings 58, 62. As a result, the mount assembly is isolated and exhibits relatively soft qualities.

The mount assembly 10 is designed to have rate and damping properties accommodating a maximum range of vibration and noise suppression conditions. Thus, during rapid acceleration and high speed cruising, the engine exhibits amplitude vibrations at an intermediate frequency and the mount assembly can accommodate such a condition. In fact, the engine tends to vibrate at a characteristic and known resonance frequency for this particular operating condition that differs from that exhibited during the operating modes just described. Prior art mounts have simply not been able to provide the additional damping control necessary to accommodate this intermediate range.

Thus when the engine is accelerated rapidly from idle, the microprocessor 84 processes the information from the transducers 90 and sends a response signal to the controller 78 to sequentially energize and de-energize the coils 70, 71. This serves to advance the gate 32 in steps into alignment with both the short and long tracks 54, 56. Since a portion of the flow is allowed to move along the shorter orifice track 54, the mount assembly exhibits intermediate stiffness, i.e. somewhat less than where only the passage 56 receives fluid, as mentioned above. The resulting improved damping enhances the versatility of the mount assembly.

To explain further, in this intermediate mode of operation, with the feed opening 76 positioned in alignment with both tracks 54 and 56, the damping liquid flow between the chambers 46, 48 is now directed through both of those tracks. Consequently, the mount assembly exhibits the relatively softer qualities. The mount assembly 10 provides just the right damping characteristics for accommodating the vibration of decreased amplitude.

During sustained high RPM operation, somewhat lower amplitude vibrations are produced than during hard acceleration. These, however, occur at a frequency higher than that exhibited during engine idling. The transducers 90 sense the changes in vibration amplitude and frequency. The microprocessor 84 processes the information and sends a response signal to the controller 78. The coil 70 is then energized to slide the gate 32 along the track 64 and bring the feed opening 76 into alignment solely with the relatively short orifice track 54. In this position, the mount assembly 10 provides a second intermediate level of damping. This level is between the first intermediate level, and the maximum level. The resulting second intermediate stiffness provides a more effective isolation of engine vibrations under sustained high RPM operating conditions.

In order to provide maximum responsiveness of operation, it should be appreciated that the gate 32 may be rapidly moved from any one of its four positions to another in response to vehicle operating conditions as sensed by the transducers 90. Thus, for example, the gate 32 may be moved so that the feed opening 76 which is initially aligned with the opening 62 if subsequently aligned solely with the long track 56. Furthermore, the transition between two different operational modes of the mount is always smooth since the coils 69–72 are energized in sequence. Thus, the gate 32 moves from its starting point to its end point in stepped manner by first moving to the next closest level of damping. This is true whether the mount is being actively tuned softer or harder in response to the operating conditions being experienced by the vehicles.

In summary, numerous benefits result from employing the concepts of the present invention. The hydraulic mount assembly incorporates a variable damping system including a magnetically responsive gate 32 that acts in cooperation with a solenoid actuator 68 having multiple coils 69–72. Energization of a specific coil in response to sensed vehicle operating and road conditions serves to positively position the gate 32 and provide for the selective flow through one or a combination of passages 54, 56 and 62 between the chambers 46 and 48. Advantageously, rapid changes in the damping and rate characteristics of the mount assembly 10 are avoided since the coils are energized and de-energized in a stepped manner to provide smoothly increasing or decreasing characteristics.

Since the transducers 90 instantaneously sense the amplitude and frequency of vibrations being produced at any given time and the pre-programmed microprocessor 84 instantaneously processes the information to select the most desired damping characteristics for the mount, rapid, more efficient and effective response and precise control of vibration and noise is assured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly providing variable damping characteristics, comprising;

a pair of mounting members;

a hollow body connected to said mounting members;

a resilient diaphragm closing said hollow body and forming therewith a closed cavity that is filled with liquid;

means for partitioning said cavity into a primary chamber and a secondary chamber enclosed by said diaphragm, said partitioning means including at least two distinct flow passages communicating between said chambers;

gate means for selectively directing a variable flow of liquid between said chambers through said passages;

track means on said means for partitioning said cavity, said gate means being adapted for sliding movement along said track means;

solenoid means on said means for partitioning said cavity, said solenoid means being adapted to positively position an opening in said gate means in alignment with a selected passage so as to provide the desired damping to said hydraulic mount assembly;

means for sensing vehicle operating conditions and resulting vibrations; and means for controlling said solenoid means in response to said means for sensing vehicle operating conditions;

said solenoid means including a series of electrical coils connected to a voltage source responsive to said controlling means and said gate means including magnetic material so as to be magnetically responsive to the magnetic force produced by said electric coils whereby the mount assembly damping characteristics are actively tuned.

* * * * *